United States Patent [19]

Tschang

[11] Patent Number: 4,458,989
[45] Date of Patent: Jul. 10, 1984

[54] ELECTRO-OPTIC ADDRESSING APPARATUS AND NOVEL MODULATOR CONFIGURATIONS FOR USE THEREIN

[75] Inventor: Pin-Seng Tschang, Rochester, N.Y.

[73] Assignee: Eastman Kodak Company, Rochester, N.Y.

[21] Appl. No.: 389,123

[22] Filed: Jun. 16, 1982

[51] Int. Cl.³ .................................................. G02F 1/03
[52] U.S. Cl. ..................................... 350/356; 350/392; 355/4
[58] Field of Search ....................... 350/356, 336, 392; 346/160; 369/110; 355/4; 358/61

[56] References Cited

U.S. PATENT DOCUMENTS 4,222,638  9/1980  Robert ............................ 350/356 X
4,378,568  3/1983  Mir ..................................... 355/4 X

FOREIGN PATENT DOCUMENTS 1534027  11/1978  United Kingdom ................ 350/392

*Primary Examiner*—John K. Corbin
*Assistant Examiner*—Lynn Vandenburgh
*Attorney, Agent, or Firm*—Raymond L. Owens

[57] ABSTRACT

Electro-optic addressing using an electro-optic modulator with improved electrode configuration and improved address control. During a first address stage activating and inactivating reference potentials are applied respectively to first and second of adjacent pixel portions of the modulator while an addressing signal potential (e.g. in accord with image data) is applied to both pixel portions. During a second address stage activating and inactivating reference potentials are applied respectively to the second and first pixel portions while signal potential is applied to both pixel portions.

4 Claims, 5 Drawing Figures

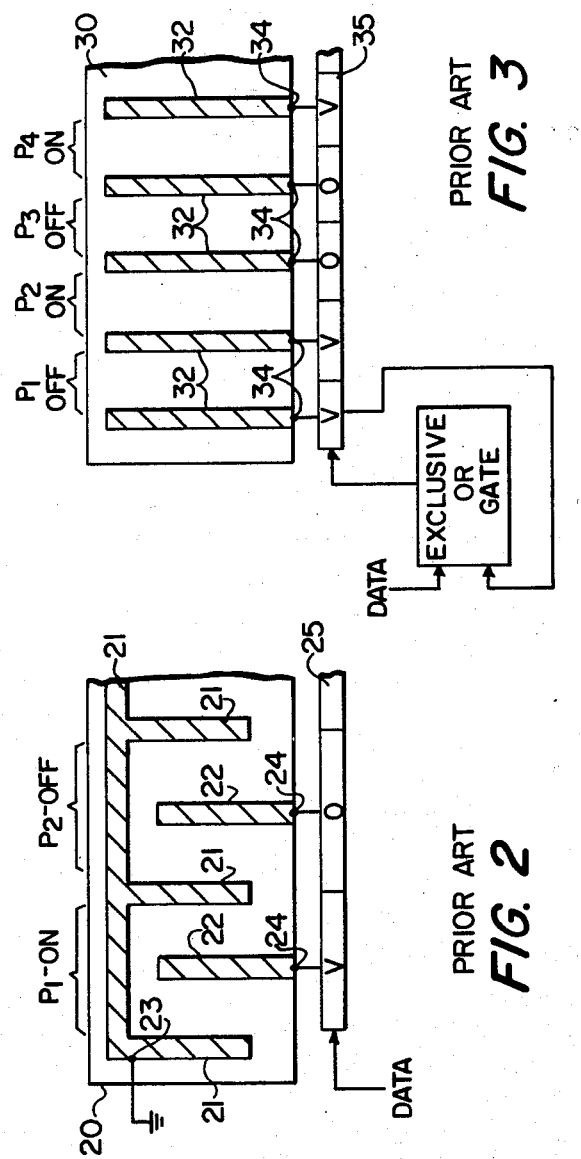

ELECTRO-OPTIC ADDRESSING APPARATUS AND NOVEL MODULATOR CONFIGURATIONS FOR USE THEREIN

BACKGROUND OF THE INVENTION

1. Field of the Invention

The present invention relates to method, apparatus and modulator configurations for electro-optically addressing (e.g. for imaging) high resolution picture elements (pixels). More specifically, the present invention relates to improved addressing electrode configurations and techniques for such electro-optic systems.

2. Description of Prior Art

U.S. Pat. No. 4,229,095 discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferroelectric ceramic material, such as lanthanum doped lead zirconate titanate (PLZT) sandwiched between crossed polarizers and activated to operate in a quadratic Kerr cell mode. Thus an array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing such light valves in synchronization with the energization of red, green and blue exposing sources and according to the red, green and blue color information for the pixels of that image.

One difficult problem, which is presented in implementing address of such light valve arrays (and in the address of other analogous high resolution, electro-optic modulators), is to provide "efficient" electrode configurations for applying electrical potentials to create the desired electrical fields. From one viewpoint electrode configurations should be efficient as to minimizing modulator area which they occupy in order to maximize the area available for light modulation. From another viewpoint the electrode configurations should be efficient as to the number of terminals required to operatively connect them to the intended address control system. Also, it is desirable to minimize the number of switch and counter circuits needed to operate such modulator arrays, and electrode configuration often influences such switch and counter circuit requirements.

FIG. 2 illustrates one common kind of prior art electrode configuration for a high resolution electro-optic modulator 20. This configuration features a plurality of spaced reference-potential electrodes 21 that are commonly coupled and thus require only one connection terminal 23. Signal electrodes 22 are located respectively between reference electrode pairs and each have a separate terminal 24 to an address source, e.g. serial-in/parallel-out shift register 25. A high voltage switch (not shown) is required between each terminal 24 and the shift register 25. As shown, a signal potential "V" from the shift register turns its signal electrode 22 "on" and creates an activating field across pixel portion $P_1$. A signal potential "0" leaves its signal electrode 22 off and pixel portion $P_2$ thus remains "off". While this configuration is relatively efficient from the minimum-terminal viewpoint (i.e. it still requires one terminal and switch per pixel portion), it is not optically efficient, generally requiring two electrodes per pixel portion of the modulator.

FIG. 3 illustrates another prior art electrode configuration which is more efficient from the optical viewpoint, requiring one electrode per pixel portion. Thus modulator 30 has signal electrodes which are each independently addressable (via a terminal 34 and high-voltage switch, not shown) by a shift register 35. Data is input serially through an "exclusive or" gate so that adjacent signal electrodes 32 are of different potential if the pixel portion therebetween is to be "on" (e.g. $P_2$ and $P_4$) and at the same potential if the intermediate pixel portion is to be "off" (e.g. $P_1$ and $P_3$). This configuration still requires one terminal and switch (and perhaps counter) per pixel portion of the modulator. Further, it has been found that modulation efficiency of the FIG. 3 type configuration is sometimes reduced because the directions of the transverse electrical fields alter frequently according to demands of the group data input to the shift register.

SUMMARY OF THE INVENTION

A significant purpose of the present invention is to improve the efficiency of high resolution, electro-optic modulator arrays and thus the imaging apparatus and electro-optical address techniques which employ such arrays. Another significant purpose of the present invention is to provide improvements in electrode configuration and address control systems of electro-optical address (e.g., electronic imaging) apparatus.

One particularly important advantage of the present invention is its relatively high efficiency in the aspect of minimizing terminals, switches and, in some modes, counters. Another important advantage of the present invention is that it provides economy as to the number of terminals, while maintaining good optical efficiency. Another important advantage of the present invention is that it achieves the afore-mentioned benefits in a manner providing highly effective electrical fields for activating the modulator pixel portions.

In general the above and other advantages are accomplished in accordance with one aspect of the present invention using an electro-optic modulator of improved electrode configuration with an improved address technique. A first address stage of this technique includes applying activating and inactivating reference potentials respectively to first and second adjacent pixel portions of the modulator while applying signal potential (e.g. in accord with image data) to address both of those portions. During a second address stage activating and inactivating reference potentials are applied respectively to the second and first pixel portions while signal potential is again applied to address both portions in accord with pixel address data.

In another aspect, a preferred modulator embodiment in accord with the present invention includes: (a) a panel of electro-optic material, including a linear array of high resolution pixel portions, each transformable to an active condition, by an activating electrical field; (b)

first electrode means comprising a plurality of electrically coupled first reference electrodes formed on said panel in spaced relation; (c) second electrode means comprising a plurality of electrically coupled second reference electrodes formed on said panel in spaced relation and interleaved with said first electrodes so that sequential-address pairs of adjacent pixel portions are located between respective pairs of said first and second reference electrodes; and (d) a plurality of signal electrodes, each adapted for independent address with a signal potential, and formed on said panel in a spaced relation, respectively between the pixel portions of the sequential-address pairs.

In another aspect, the present invention involves electronic imaging apparatus employing such preferred modulator embodiments and having control means for operating such modulators in the mode described above.

BRIEF DESCRIPTION OF THE DRAWINGS

The subsequent description of preferred embodiments of the invention refers to the attached drawings in which:

FIGS. 2 and 3 are plan views of prior art electrode configurations for electro-optic modulators, discussed above;

DETAILED DESCRIPTION OF THE PREFERRED EMBODIMENTS

Figure 1:
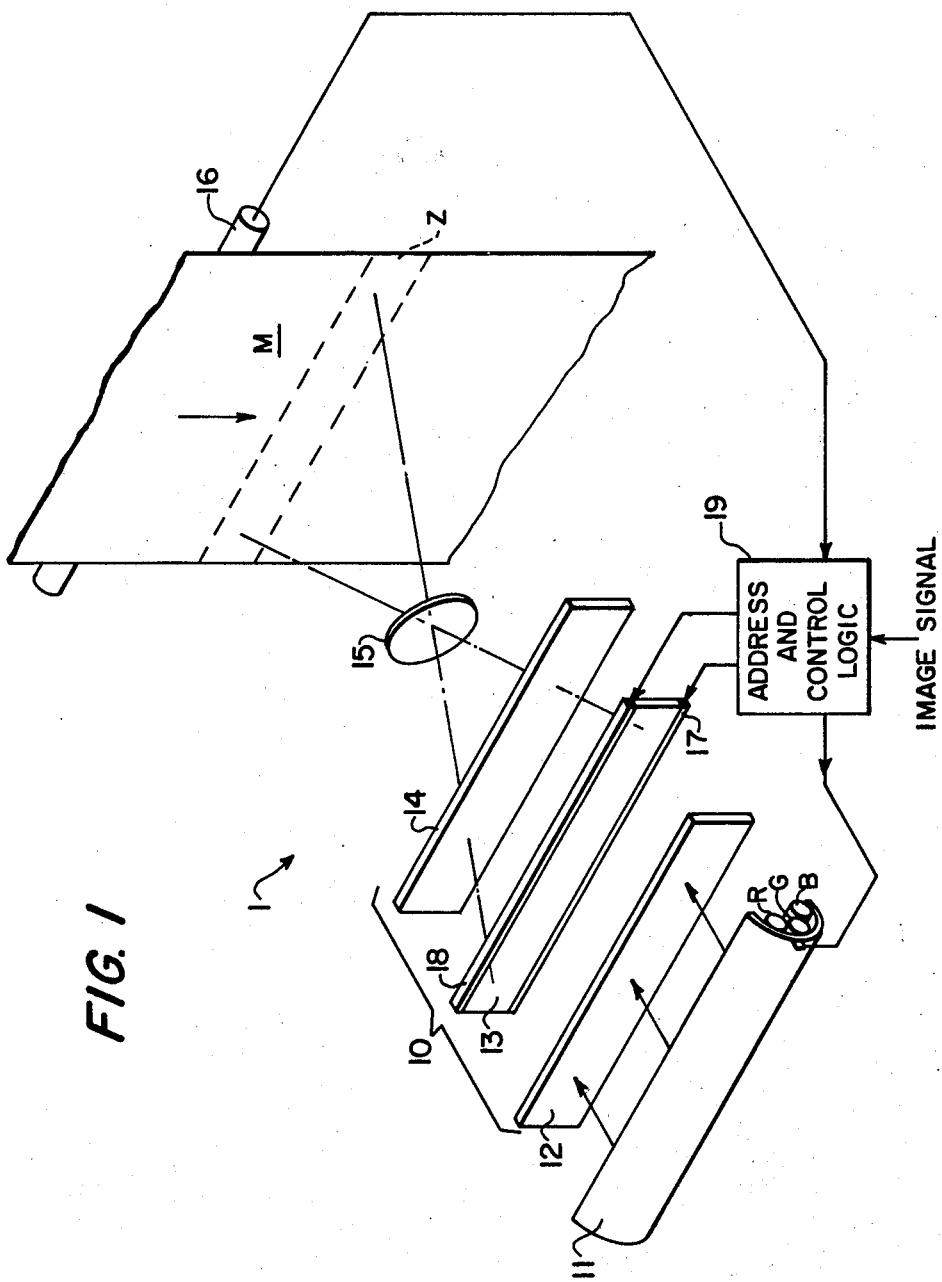
FIG. 1 is a schematic perspective view of one preferred embodiment of electronic imaging apparatus incorporating the present invention.

FIG. 1 illustrates one embodiment of electronic imaging apparatus 1 incorporating an electro-optic modulator in accordance with the present invention. In this apparatus the modulator 13 forms with sandwiching cross polarizing means 12 and 14 a linear light valve array, denoted generally 10. The imaging apparatus 1 further comprises an illumination source 11 adapted to direct uniform light onto the light valve array 10. Address and control logic 19 activates individual pixel portions of the modulator independently between birefringent and non-birefringent states so that pixel portions of light from source 11 are turned "on" and "off", with respect to an exposure zone Z, by the light valve array 10. Lens 15 images the light valve array 10 at the exposure zone Z so that photosensitive recording medium M moved therepast by transport 16 (under the control of logic 19) is imagewise exposed by the light valve array and its associated address means.

The overall purpose of such addressing control is to turn the individual pixel portions of the light valve "on" and "off" in timed relation with the movement of the recording medium and in accordance with the image content of successive image lines to be reproduced. In the embodiment illustrated in FIG. 1, separate red, green and blue exposure sub-periods are provided (by sources R, G, B) for each line exposure period, and the light valve 10 is separately addressed with appropriate image information during each different sub-period.

Figure 4:
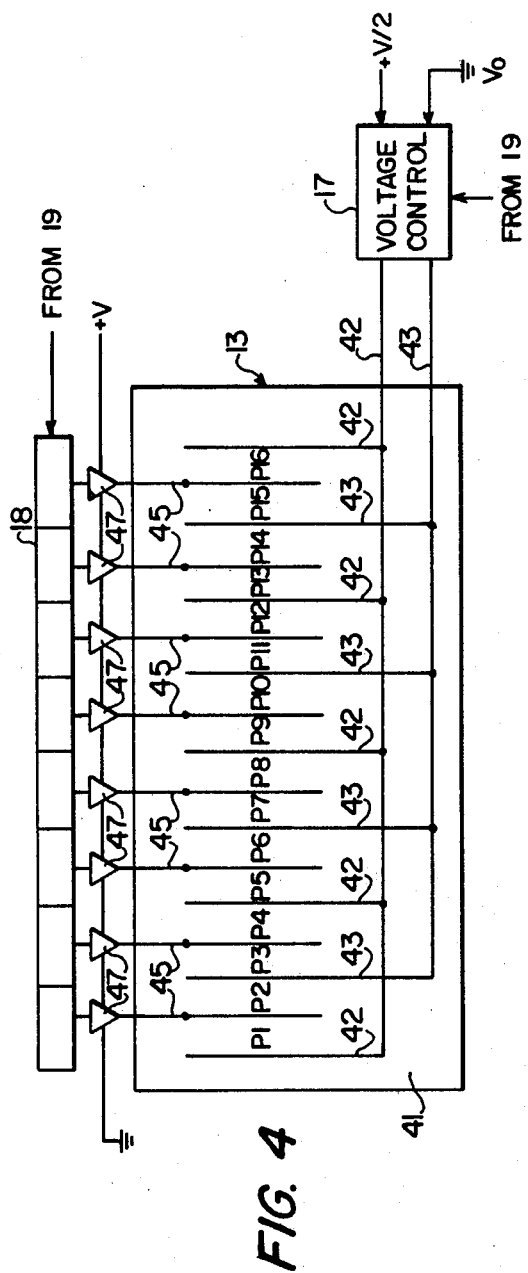
FIG. 4 is a plan view of one preferred embodiment of electro-optic modulator in accord with the present invention.

The details of one preferred electro-optic modulator 13 in accord with the present invention (and its operation in the FIG. 1 electronic imaging apparatus) can be understood by referring also to FIG. 4. The modulator 13 comprises a panel 41 of electro-optic material (e.g. PLZT) which is activatable by an electric field of predetermined magnitude to cause a shift in light polarization sufficient to cause significant transmission through polarizer 14.

More specifically, in accord with the present invention, the modulator panel is formed of an electro-optic material which: (1) is highly birefringent in the presence of transverse potential of nominal activating level $+V$, e.g. preferably the half-wave voltage for the panel, (2) is isotropic in the presence of zero or small transverse potentials $V_o$ and (3) behaves macroscopically as substantially isotropic in the presence of transverse potentials approximately intermediate $+V$ and $V_o$, e.g. approximately $+V/2$. One highly preferred material for such panel is 9.0-65-35 PLZT.

Other useful and preferred materials and potential levels for modulator panels can be determined by placing a prospective panel between crossed polarizers as shown in FIG. 1, directing light onto this light valve configuration, applying a variable transverse potential between adjacent electrodes until maximum light transmission is observed and then decreasing the applied potential until light transmission is substantially blocked. This decreased, inactivating potential level, indicates a useful panel material and provides a useful intermediate potential level if it is approximately $+V/2$ i.e. about one-half the potential of maximum light transmission commonly termed the "half-wave voltage". It will be understood that useful results can be obtained with applied potentials $+V$ somewhat less than the half-wave voltage and in this mode the intermediate potential would preferably be about one-half of that applied potential.

In accord with the present invention, the modulator 13 further comprises first electrode means including a plurality of electrically coupled first reference electrodes 42 formed on the panel 41 in spaced relation and second electrode means including a plurality of electrically coupled second reference electrodes 43 formed in similarly spaced relation on panel 41. The first and second reference electrodes 42, 43 are separate electrical circuits but are interleaved so as to form adjacent sequential-address pairs of pixel portions (i.e. $P_1$-$P_2$, $P_3$-$P_4$. . . $P_{15}$-$P_{16}$) located therebetween as shown in FIG. 4.

The modulator 13 further comprises a plurality of signal electrodes 45 formed on the panel 41 in spaced relation and between respective sequential-address pairs of pixel portions as shown in FIG. 4. Each of the signal electrodes 45 has a separate terminal and is independently addressable by address means within logic 19 through shift register 18 and high voltage switches 47. When addressed by the logic 19, signal electrodes have either an applied potential signal $+V$ (when light is to be transmitted) or an applied potential sign $V_o$ (when no light is to be transmitted). Voltage control 17 also is under control of logic 19 and is adapted, during a first address stage, to apply an activating reference potential $V_o$ to the first reference electrodes 42 and an inactivating potential $V/2$ to the second reference electrodes 43. Subsequently under the control of logic 19 and during a second address stage, voltage control 17 applies an activating potential $V_o$ to the second reference electrodes 43 and an inactivating potential $V/2$ to the first reference electrodes 42.

The modulator 13, in cooperation with sandwiching crossed polarizers 12 and 14, provides a highly useful light valve array for optical address and electronic imaging. In such operation, during such a first stage of a line exposure period which, for color imaging, would be the first stage of a line exposure color-sub-period, voltage control 17 references all electrodes 42 to a potential $V_o$ and references all electrodes 43 to potential $V/2$. Signal electrodes 45 are addressed by logic 19 with a potential $+V$ or $V_o$ in accordance with the particular image data for that line exposure sub-period, i.e. according to whether or not their related, activated pixel portion should transmit light or not during that stage of the given line exposure period. Thus first stage pixel portions $P_1$, $P_4$, $P_5$, $P_8$, $P_9$, $P_{12}$, $P_{13}$ and $P_{16}$ are referenced by an activating potential $V_o$ and if their related signal electrode 45 is addressed with signal potential $+V$, the resultant electric field causes electro-optic modulation effecting light transmission through the associated light valve pixel portion. If the related signal electrode 45 has an applied signal potential $V_o$, no light is transmitted through the associated light valve pixel portion. The complementary second stage pixel portions $P_2$, $P_3$, $P_6$, $P_7$, $P_{10}$, $P_{11}$, $P_{14}$ and $P_{15}$ of modulator 13 are inactivated during the first stage period by application of potential $V/2$. Thus whether or not their respectively associated signal electrodes 45 are energized, the second stage pixel portions do not transmit light.

During the second address stage of the exposure period the second stage pixel portions are referenced by potential $V_o$ applied to electrode means 43 and their associated light valve pixel portions transmit light or not depending on the signals $+V$ or $V_o$ applied to their related signal electrode 45. During this stage the first stage pixel portions are inactivated by application of potential $V/2$ to electrodes 42.

Considering the foregoing, it will be appreciated that the electrode configuration and control system of the FIG. 4 modulator facilitates electro-optic address of pixel portions $P_1$-$P_{16}$ with improved efficiency as to terminals and switches. Further, such efficiency carries forth to counters if the activation period of each switch is controlled independently by a counter (not shown), e.g. to provide gray scale imaging.

Figure 5:
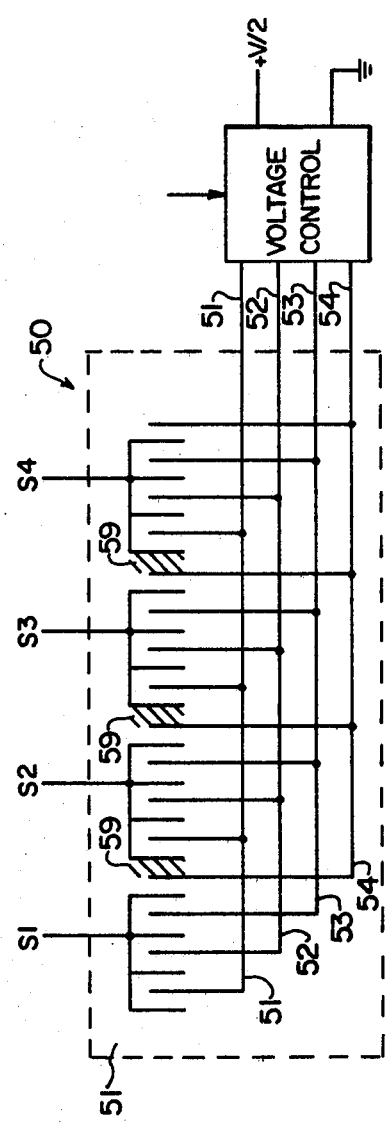
FIG. 5 is a plan view of another embodiment of electro-optic modulator in accord with the present invention.

FIG. 5 shows another embodiment of modulator 50 in accord with the present invention. This embodiment includes four reference electrode means each having a plurality of reference electrodes 51, 52, 53 and 54 respectively which are coupled for common activation by voltage control 17. In this embodiment one group of reference electrodes, e.g. 51, is activated to potential level $V_o$ and the other three, e.g. 52, 53 and 54 have an applied inactivating potential $V/2$. During this first address stage the signal electrodes $S_l$, $S_2$, $S_3$ and $S_4$ are addressed with a signal potential level $+V$ or $V_o$ in accord with image information from logic 19. Light valve pixel portions corresponding to modulator pixel portions between a signal electrode and the activated reference portions 51 will transmit light or not depending on the signal electrodes' applied $+V$ or $V_o$ potential. During the next stages, i.e. second, third and fourth address stages, successive ones of the other reference electrode means 52, 53, 54 are activated with potential $V_o$ while the remainder are inactivated with potential $V/2$. In the FIG. 5 embodiment it is useful to block areas 59 to prevent unwanted light transmission due to cross-field effects.

It will be appreciated that modulators in accord with the present invention provide their advantages for electro-optical addressing applications other than electronic imaging. For example in electronic scanning a photocell can be provided for each sequential-address pair of light valve pixel portions so that an intermediate transparency can be scanned (i.e. optically addressed) with the electrode efficiencies of the present invention. In this mode signal electrodes would all receive $+V$ applied signal potentials during each address stage. The invention has been described in detail with particular reference to preferred embodiments thereof, but it will be understood that variations and modifications can be effected within the spirit and scope of the invention.

What is claimed is:

1. An electro-optical address device comprising:
   (a) a panel of electro-optic material, including a linear array of high resolution pixel portions, each transformable to an active condition by an activating electrical field;
   (b) first electrode means comprising a plurality of electrically coupled first reference electrodes formed on said panel in spaced relation;
   (c) second electrode means comprising a plurality of electrically coupled second reference electrodes formed on said panel in spaced relation an interleaved with said first electrodes so that adjacent sequential-address pairs of pixel portions are located between respective first and second reference electrode pairs;
   (d) a plurality of signal electrodes, each adapted for independent address with a signal potential, and formed on said panel in a spaced relation, respectively between the pixel portions of said sequential-address pairs;
   (e) address means for applying signal potential to predeterminedly address said signal electrodes during each of sequential first and second modulator address stages;
   (f) means for applying an activating reference potential substantially different than said signal potential to said first reference electrodes during said first address stage and for applying an inactivating reference potential, intermediate in magnitude with respect to said signal potential and said activating potential, to said first reference electrodes during said second address stage; and
   (g) means for applying said inactivating reference potential to said second reference electrodes during said first address stage and for applying said activating reference potential to said second reference electrodes during said second address stage.

2. A light valve electronic imaging apparatus comprising:
   (a) a panel of electro-optic material, including a linear array of high resolution pixel portions, each transformable to an active condition by an activating electrical field;
   (b) first electrode means comprising a plurality of electrically coupled first reference electrodes formed on said panel in spaced relation;
   (c) second electrode means comprising a plurality of electrically coupled second reference electrodes formed on said panel in spaced relation and interleaved with said first electrodes so that adjacent sequential-address pairs of pixel portions are located between respective first and second reference electrode pairs;

(d) a plurality of signal electrodes, each adapted for independent address with a signal potential, and formed on said panel in a spaced relation, respectively between the pixel portions of said sequential-address pairs;

(e) image address means for applying to said signal electrodes, during a first address stage, signal potential in accord with a portion of an image line to be reproduced by a first set of said pixel portions and for applying to said signal electrodes, during a second address stage, signal potential in accord with a a portion of an image line to be reproduced by a second set of said pixel portions;

(f) means for applying an activating reference potential substantially different than said signal potential to said first reference electrodes during said first address stage and for applying an inactivating reference potential intermediate in magnitude with respect to said signal and activating potentials to said first reference electrodes during said second address stage; and (g) means for applying said inactivating reference potential to said second reference electrodes during said first address stage and for applying said activating reference potential said second reference electrodes during said second address stage.

3. The invention defined in claims 1 or 2 wherein said signal potential is approximately the half-wave voltage for said pixel portions.

4. The invention defined in claim 3 wherein said inactivating potential is substantially one-half of said half-wave voltage and said activating potential is substantially zero.

* * * * *

UNITED STATES PATENT AND TRADEMARK OFFICE
CERTIFICATE OF CORRECTION

PATENT NO. : 4,458,989
DATED : July 10, 1984
INVENTOR(S) : Pin-Seng Tschang

It is certified that error appears in the above—identified patent and that said Letters Patent is hereby corrected as shown below:

Column 6, line 26, delete "an" and insert therefor -- and --.

Signed and Sealed this

Tenth Day of September 1985

[SEAL]

Attest:

DONALD J. QUIGG

*Attesting Officer*    Acting Commissioner of Patents and Trademarks - Designate